United States Patent Office 3,438,446
Patented Apr. 15, 1969

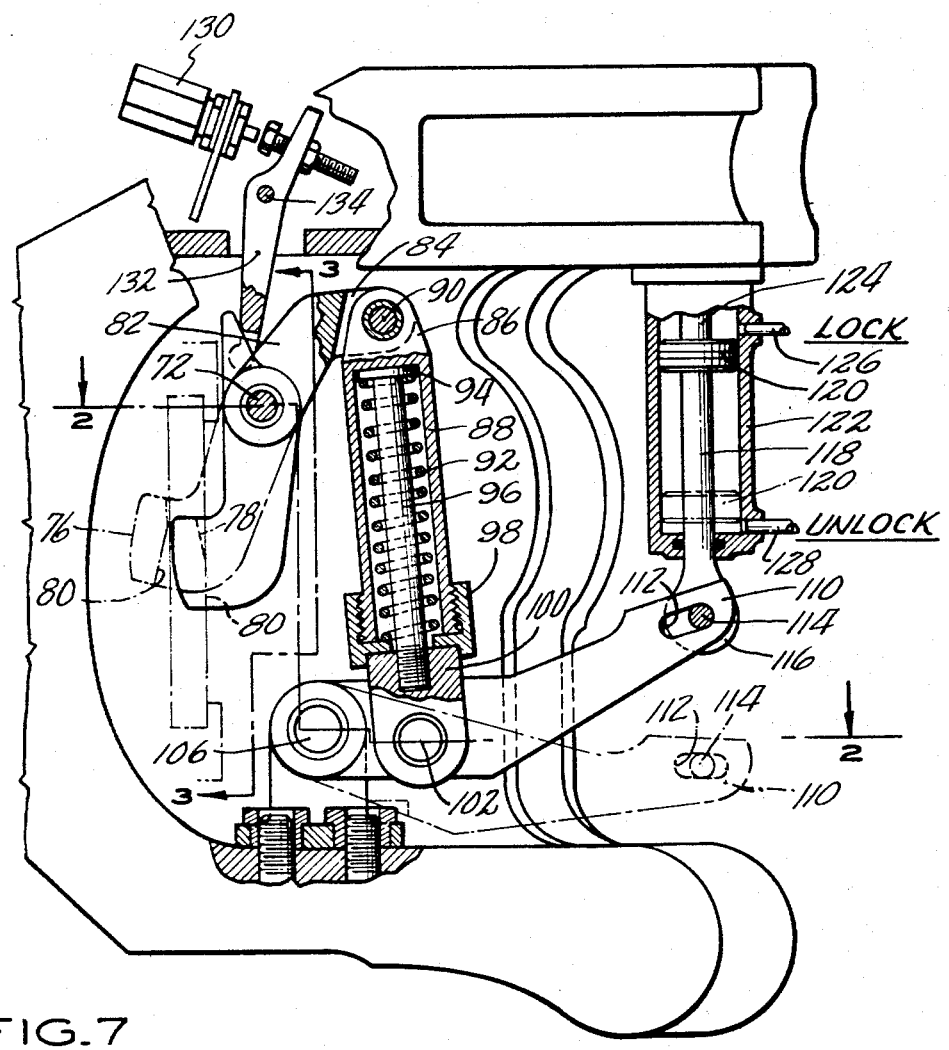
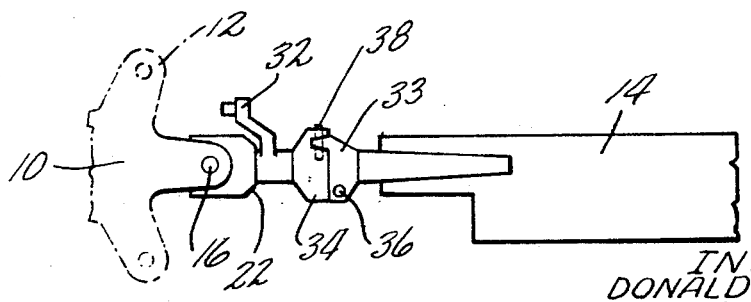

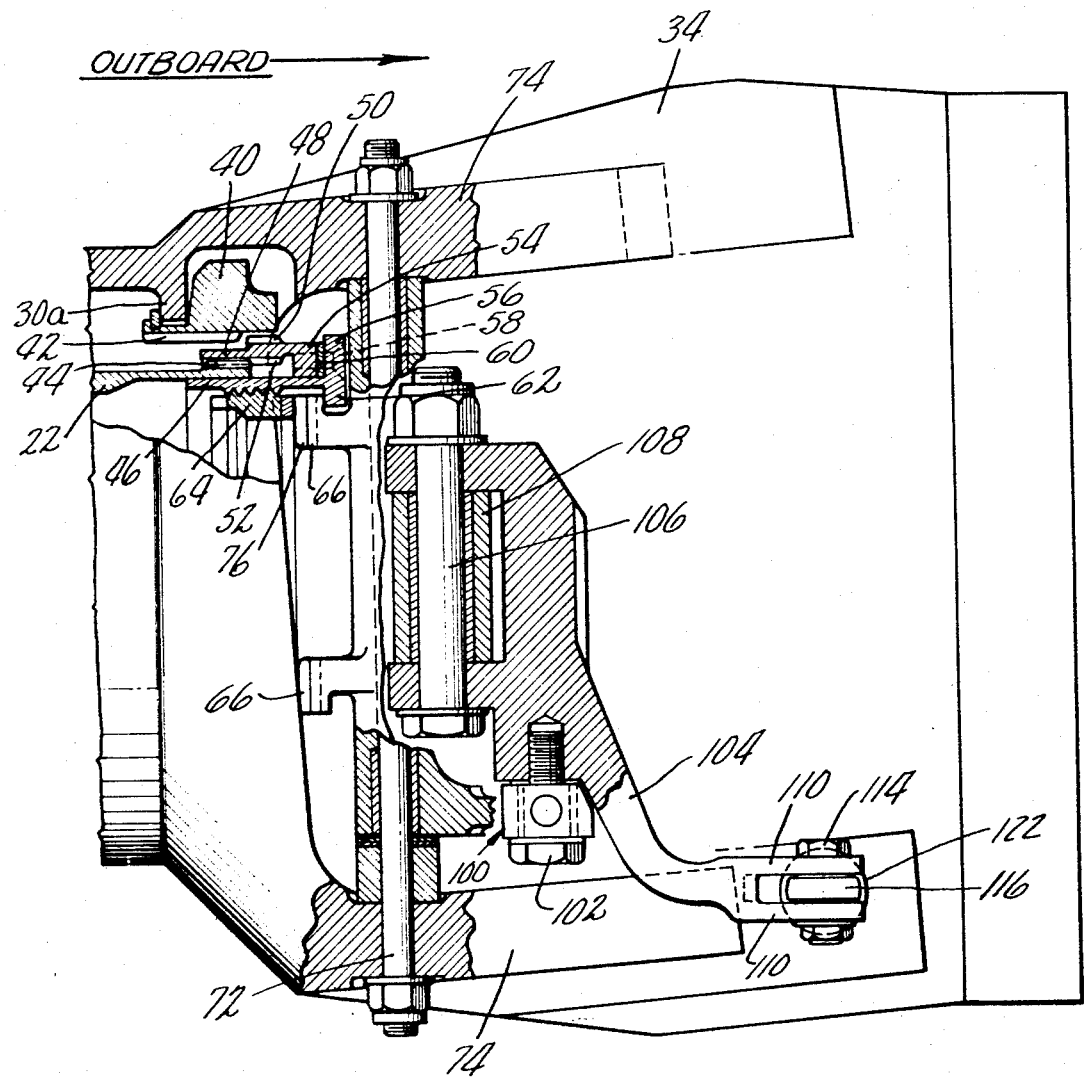

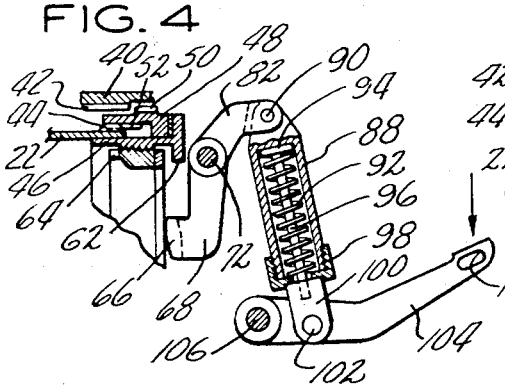
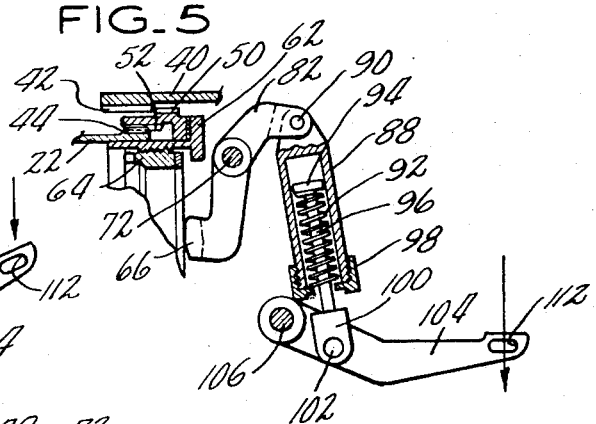
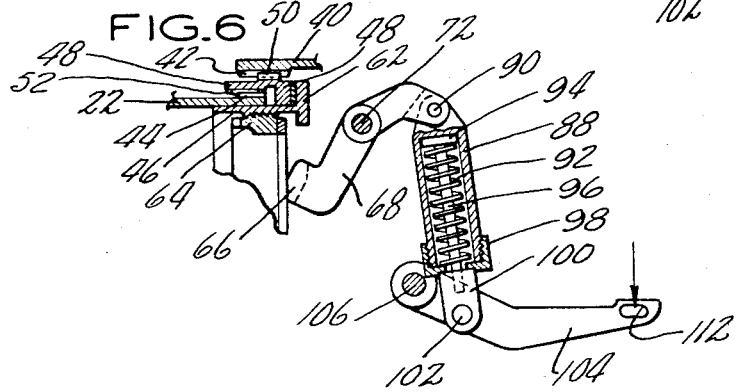
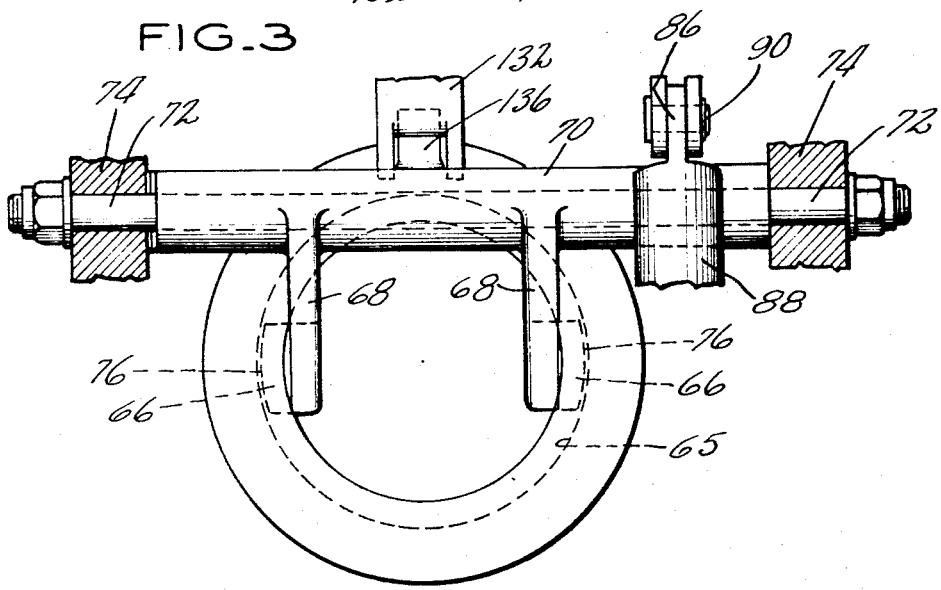

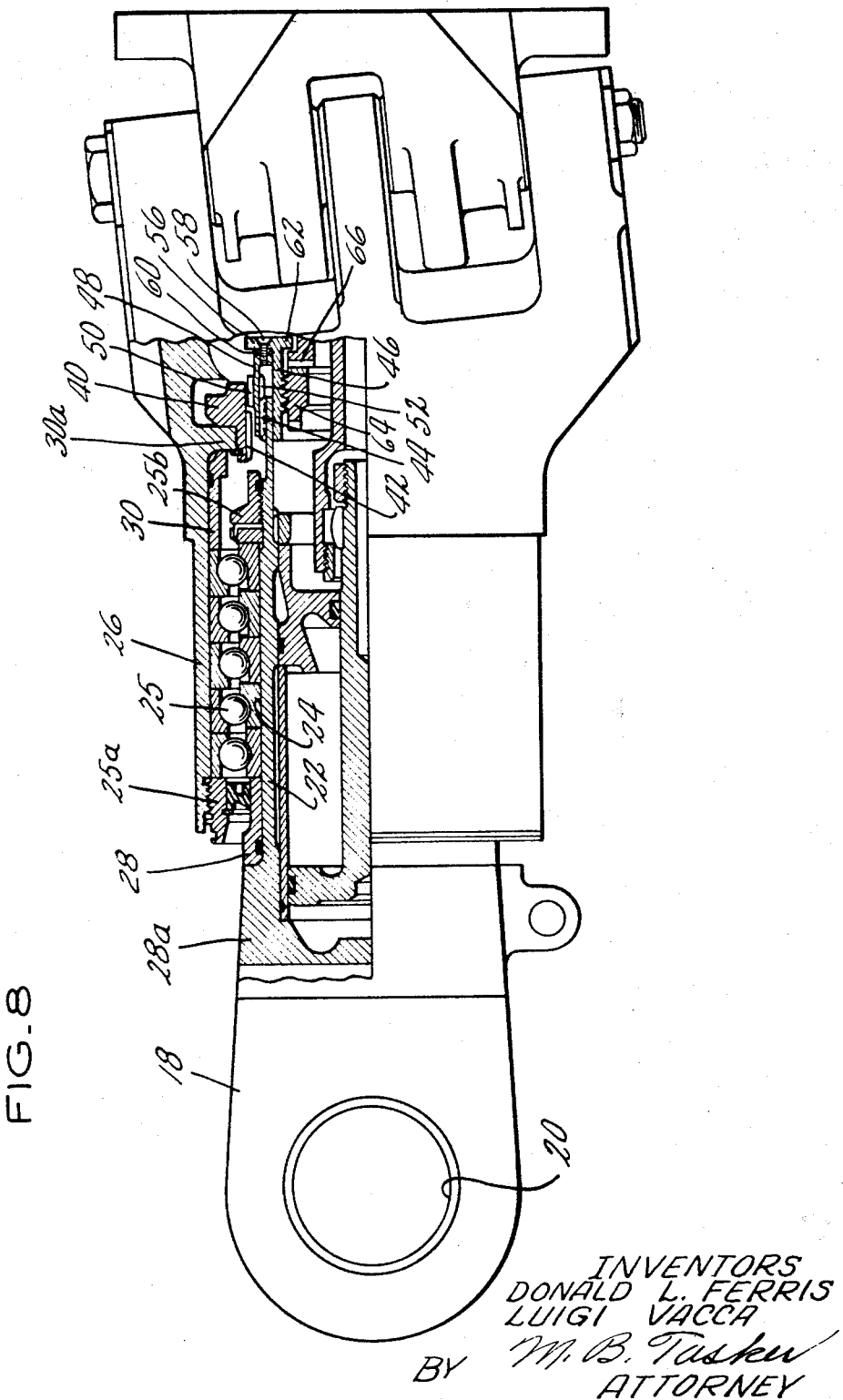

3,438,446
ROTOR BLADE PITCH LOCK
Luigi Vacca, Milford, and Donald L. Ferris, Newtown, Conn., assignors to United Aircraft Corporation, East Hartford, Conn., a corporation of Delaware
Filed Oct. 3, 1967, Ser. No. 672,616
Int. Cl. B64c 27/50
U.S. Cl. 170—160.12                                 6 Claims

ABSTRACT OF THE DISCLOSURE

A variable pitch rotor blade has mechanism at the root of the blade for locking the blade against pitch change preliminary to folding the blade for storage including an assembly slidable axially of the blade between the blade sleeve and the blade spindle. The assembly has external and internal splines which engage cooperating splines located inboard of the slidable assembly on the blade sleeve and blade spindle, respectively. Remote controlled actuating means for the sliding splined assembly is connected to pin pulling mechanism associated with the blade folding hinge mechanism and includes a spring biased cocking mechanism for urging the splined assembly inboard axially into spline engaging position to lock the blade pitch when the splines are brought into alignment.

Background of the invention

This invention relates to rotary wing aircraft and particularly to improved mechanism for locking the variable pitch blades of such aircraft preliminary to folding the blades to permit storage of the aircraft when not in use.

When rotary wing aircraft, such as helicopters, are stored in a hanger or are used on surface ships, it is necessary to fold the rotor blades into a compact position over the tail cone. To enable this the blades are hinged near the root of the blade and, in order to have the hinge pins about which the blades fold in the proper position for folding and to hold them there, it is necessary to lock the blades in neutral pitch, or some predetermined low pitch position, before folding.

The present invention is well adapted for use in rotary wing aircraft of the general character disclosed in U.S. Patents Nos. 2,925,130 and 3,097,701 which issued to Michel Buivid.

Prior to the present invention, blade pitch locking mechanisms have been used for foldable blades which were subject to the disadvantage that if the mechanism controlling the pitch lock failed in flight, the main rotor blades of the aircraft could become locked in a low pitch position by centrifugal force acting on the pitch locking mechanism. The present invention eliminates this possibility. One such mechanism is shown in application Ser. No. 635,329, filed Apr. 27, 1967, by L. Vacca, D. Ferris and R. Zincone and entitled "Pitch Mechanism Lock for Main Helicopter Rotor Blades," now Patent 3,369,611 dated Feb. 20, 1968.

Summary of the invention

The present invention is directed to an improved blade pitch locking mechanism in which an axially slidable splined assembly which locks the blade sleeve to the blade spindle is located outboard of the cooperating splines on the sleeve and spindle. Hence, in the event of failure or malfunction of the actuating means for the blade locking mechanism in flight the splined assembly is prevented from moving to blade locking position under the action of centrifugal force.

It is an object of the present invention to provide an improved blade pitch locking mechanism for the main rotor blades of a rotary wing aircraft operative to lock the blades in a predetermined pitch position when it is desired to move the blades about their hinges to a folded position and operative to unlock the blades and permit the normal pitch control of the blades during flight by the pilot's controls.

Another object of the present invention is the provision of a blade pitch locking member which is slidable axially of the blade into and out of a blade pitch locking position in which it engages and locks the blade sleeve to the blade spindle and which is located outboard of the interlocking point between the sleeve and spindle.

It is a further object of this invention to provide an improved actuating mechanism for locking and unlocking the blade pitch locking mechanism of a rotary wing aircraft preliminary to storage and during flight, respectively.

A still further object of this invention is generally to improve the pitch locking mechanism associated with the main rotor blades of rotary wing aircraft.

Other objects, advantages and novel features of the invention will become apparent from the following detailed description of the invention when considered in connection with the accompanying drawings.

Brief description of the drawings

FIG. 1 is a plan view, partly in section, of a helicopter main rotor blade in the vicinity of the blade folding hinge illustrating the actuating mechanism for the blade pitch locking structure of the invention.

FIG. 2 is a section on line 2—2 of FIG. 1.

FIG. 3 is a section on line 3—3 of FIG. 1.

FIGS. 4, 5 and 6 are diagrammatic illustrations of three different positions the actuating mechanism for the blade pitch locking mechanism may assume in operation.

FIG. 7 is a somewhat simplified plan view of a helicopter rotor, parts being omitted and broken away to facilitate illustration.

FIG. 8 is a much enlarged view of a rotor blade in the vicinity of the flapping link, parts being shown in section.

Description of the preferred embodiment

Referring to the drawings, and particularly FIG. 7, the main sustaining rotor of the helicopter comprises two identical vertically spaced plate-like members 10 mounted on the upper end of the rotor drive shaft (not shown), only one of the plates 10 being shown in FIG. 7. These plates have radially extended arms 12 between which rotor blades 14 are pivoted on generally vertical drag hinge pins 16. Each blade has a flapping link 18 provided with an aperture 20 (FIG. 8) to receive a generally horizontal flapping pin (not shown), the axis of which intersects the axis of drag pin 16 at right angles.

The flapping link of each blade is formed outboard of the flapping pin with a radially extended spindle 22 (FIG. 8) on which the blade is journalled for pitch changing movement. The spindle 22 is formed as a hollow cylinder having a smooth exterior surface portion 24 on which a plurality of bearings are fixed, herein shown as ball and ball race assemblies 25, and on which the sleeve 26 of the blade is journalled, as shown in FIG. 8. Herein it will be noted that blade sleeve 26 has a smooth interior surface to receive the outer races of the ball race assemblies 25 and that the latter are secured to the blade spindle and blade sleeve by press fitting and also by annular threaded rings 25a and 25b carried by the spindle and sleeve, respectively, which urge the ball races against suitable abutments on the blade sleeve and spindle. On the spindle a spacer sleeve 28 bears against an abutment 28a. On the sleeve a similar spacer sleeve 30 bears against an abutment 30a.

Blade sleeve 26 carries a usual horn 32 (FIG. 7) which is connected by suitable linkage to the pilot's controls for changing the pitch of the blade by rotation of sleeve 26. This structure is well known in the art and is fully described in the Buivid Patent No. 3,097,701 previously mentioned.

Each blade 14 is attached to an outboard hinge portion 33. The cooperating inboard hinge portion 34 terminates in sleeve 26 which, as previously described, is journalled on blade spindle 22. The two hinge portions are connected by a fixed hinge pin 36 about which the blade pivots in folding and a withdrawable pin 38 (shown dotted in FIG. 7) which locks the blade in flight position. The details of the hinge portions 33 and 34 as well as the hinge pins 36 and 38 for retaining these portions of the hinge structure form no part of the present invention.

In accordance with this invention improved means are provided for locking the blade sleeve 26 to the spindle 22 in a predetermined relation of the two in which the blade is at zero pitch, or some other selected low pitch position of the blade, in which the pin 36 about which the blade pivots in folding is at the proper angle to bring the blade into folded position over the tail cone. For this purpose each blade sleeve 26 has an internal pitch lock spline ring 40 fixed to its abutment 30a and provided with a female pitch lock splines 42.

At an adjacent point on the blade spindle 22 male splines 44 are formed on the external annular surface of the blade spindle at its outboard extremity. An axially slidable spline assembly is provided having an annular guide sleeve 46 which is a close sliding fit within the inner bore of the hollow spindle 22, and also having a locking splined sleeve 48 which carries external splines 50 and internal female splines 52 which are in position to mesh with splines 42 and 44 on the sleeve and spindle, respectively. Splines 50 are short and in the flight position of the splined assembly shown in FIG. 2 are out of engagement with splines 42. Splines 52, however, are sufficiently long to engage with splines 44 on the spindle in any position of the spline assembly. Splined sleeve 48 has an integral inwardly directed annular flange 54 by which it is secured to an outwardly directed annular flange 56 on guide sleeve 46 by a plurality of flat-headed screws 58, one of which is shown dotted in FIG. 2. An annular shim 60 is provided between flange 56 and splined sleeve 48, the thickness of which determines the axial adjustment of sleeve 48. Guide sleeve 46 also has an inwardly directed annular flange 62 which, with the annular inboard internal nut 64 of the sliding spline assembly 48, forms an annular actuating groove 65 by means of which the assembly is moved axially by two cams 66 which lie in the groove (FIG. 3).

The two cams 66 lie on diametrically opposite sides of the blade and are carried by two secondary pitch lock arms 68 formed integral with a sleeve 70 journalled on shaft 72 carried rigidly by the secondary pitch lock arm support 74 forming part of the inboard hinge portion 34. Cams 66 have slightly curved inboard extremities 76 (FIG. 1) and are relieved at 78 and 80 (FIGS. 1 and 3) on their outboard faces so they can swing through a slight angle about the axis of shaft 72 without binding in groove 65.

Sleeve 70 has an integral arm 82 formed with bifurcations 84 at its free end between which one end 86 of a spring retaining housing 88 is pivoted on a pin 90 (FIG. 1). A spring 92 in the housing has one end abutting the head 94 of a piston-like bolt 96 with its other end engaging the cap 98 which is screw-threaded onto the lower end of the spring retaining housing 88 and forms a closure for it. Bolt 96 has its other end extended through cap 98 and threaded into a fitting 100 which is pivotally connected by means of a cap screw 102 with the primary pitch lock arm 104 intermediate the ends of the latter. Arm 104 is pivoted at its inboard end on a bolt 106 carried by support 108 which is part of the inboard hinge portion 34. The free end of arm 104 is bifurcated at 110 and these furcations have slots 112 to receive a bolt 114. On bolt 114 and between the furcations 110 is pivoted the extended end 116 of a piston rod 118 which terminates in piston 120 in a hydraulic cylinder 122. Piston rod 118 has an extension 124 which carries the withdrawable hinge pin 38 shown in FIG. 7.

As shown in FIG. 1, the piston 120 is in full lines in flight position and in dotted lines in the blade folded position. Fluid lines 126 and 128 are provided for admitting hydraulic fluid to opposite sides of the piston in the two extreme positions thereof shown in full and dotted lines in FIG. 1, it being understood that as fluid is supplied through one fluid line the fluid in the cylinder is vented through the other line, in a well-known manner.

The position of the sliding spline assembly is indicated by means of a microswitch 130 which is actuated by an arm 132 pivoted at 134. The inner end of arm 132 is bifurcated as shown in FIG. 3 and a lateral extension 136 on sleeve 70 extends between the furcations in position to engage arm 132 and move it counterclockwise about pivot 134 to actuate the switch when the slidable spline assembly is moved into position to lock the blade sleeve to the blade spindle.

The operation of the pitch lock of this invention is illustrated most clearly in FIGS. 4, 5 and 6. In the normal flight position of the mechanism, in which the sleeve 26 is unlocked and the pitch of the blade can be controlled by the pilot, the sliding spline assembly is in the FIG. 2 and FIG. 4 position in which the splines 42 on the blade sleeve and the splines 50 on the splined assembly are disengaged. When it is desired to fold the blade, hydraulic fluid is supplied to fluid line 126 of the several blades, moving the primary pitch lock arm 104 of each blade downwardly to FIG. 5 position. Simultaneously with the downward movement of piston 120, pin 38 is withdrawn, conditioning the blade for folding. As arm 104 moves down to the FIG. 5 position, splines 42 and 50 will be moved into abutting position but, since they are not in the rotational position to mesh, spring retaining housing 88 and pitch lock arms 68 and 82 will remain in the FIG. 4 position while bolt head 94 will move to the FIG. 5 position and compress spring 92. When, however, the pilot's pitch controls are operated to move the blade sleeve, splines 42 will be moved into position to mesh with splines 50 and the parts will move under the bias of spring 92 into the FIG. 6 position in which splines 50 will intermesh with splines 42 and the blade sleeve will be securely locked to the blade spindle.

From the above it will be evident that in the event of failure of the control mechanism for the blade pitch lock there is no possibility that the sliding spline assembly could ever move inboard to lock the sleeve 26 during flight, since centrifugal force constantly urges this assembly away from locking position.

While only one embodiment of the invention has been shown for purposes of illustration it will be evident that numerous changes may be made in the construction and arrangement of the parts without exceeding the scope of the invention as defined by the appended claims.

What is claimed and desired to be protected by Letters Patent is:

1. Pitch lock mechanism for a foldable rotary wing aircraft blade of the type having an axial blade spindle, an outboard hinge portion including a blade, and an inboard hinge portion journalled on said spindle for blade changing movement, said mechanism comprising female splines on said sleeve, male splines on said spindle, a sliding splined assembly located outboard of the splines on said sleeve and spindle including a sleeve slidable in an inboard direction between said splines on said sleeve and spindle having male and female splines thereon which intermesh with the female and male splines on said sleeve and spindle respectively to lock said sleeve to said spindle when said assembly is slid inboard, and means for moving said splined assembly inboard to lock said sleeve to said spindle and for moving said assembly outboard to free said sleeve for pitch changing movement.

2. The pitch lock mechanism of claim 1 in which the means for moving the splined assembly comprises a primary pitch lock arm carried by the inboard hinge portion, a secondary pitch lock arm carried by said inboard hinge portion, cam means carried by said secondary arm for engaging said splined assembly, and resilient means connecting said arms for biasing said secondary arm toward pitch locked position upon actuation of said primary arm into pitch locked position.

3. The pitch lock mechanism of claim 1 in which the means for moving the splined assembly is carried by the inboard hinge portion outboard of the splines on said blade sleeve and blade spindle and includes a primary pitch lock arm, a secondary pitch lock arm, cam means on said secondary arm for engaging and moving said splined assembly axially in both directions, and resilient means connecting said arms enabling said primary arm to move into pitch locked position free of said secondary arm while biasing the latter toward pitch locked position.

4. A foldable blade for rotary wing aircraft including an axial blade spindle, an outboard hinge portion having a blade carried thereby, an inboard hinge portion having a sleeve journalled on said spindle for pitch changing movement of said blade about the axis of the spindle, female splines on said sleeve, male splines on said spindle, said splines being located outboard of the journal and being radially spaced from each other, an assembly located outboard of said splines and slidable axially of said spindle having a sleeve slidable in the space between said splines, said sleeve having male and female splines intermeshing with the splines on said sleeve and spindle respectively when said assembly is moved in an inboard direction, and means for moving said assembly in an inboard direction to lock said sleeve and spindle together and in an outboard direction to free said sleeve for pitch changing movement.

5. A foldable blade for rotary wing aircraft including a flapping link terminating in an outboard blade spindle, an outboard hinge portion having a blade carried thereby, an inboard hinge portion having a sleeve journalled on said spindle for pitch changing movement of the blade about the axis of said spindle, female splines on said sleeve, male splines on said spindle, a splined assembly located outboard of said splines on said sleeve and spindle and slidable axially of said spindle including a sleeve having male and female splines for cooperation with the female and male splines on said sleeve and spindle respectively, and means for moving said splined assembly into and out of blade pitch locking position in which the splines on said sleeve and spindle are intermeshed.

6. A foldable blade for rotary wing aircraft including an axial blade spindle, an outboard hinge portion having a blade carried thereby, an inboard hinge portion having a sleeve journalled on the spindle for pitch changing movement of the blade about the axis of said spindle, female splines on said sleeve, male splines on said spindle, a splined assembly outboard of the splines on said sleeve and spindle including a sleeve slidable axially between said sleeve and said spindle having male and female splines which intermesh with the splines on said sleeve and spindle as said assembly is moved in an inboard direction, and actuating means for moving said splined assembly in an inboard direction to effect locking of said sleeve to said spindle and in an outboard direction to unlock said sleeve for blade pitch changing movement.

References Cited
UNITED STATES PATENTS 3,097,701   7/1963   Buivid _____ 170—160.12
3,369,611   2/1968   Vacca et al. _____ 170—160.12

EVERETT A. POWELL, JR., *Primary Examiner.*

PO-1050
(5/69)

UNITED STATES PATENT OFFICE
CERTIFICATE OF CORRECTION

Patent No. 3,438,446      Dated April 15, 1969

Inventor(s) LUIGI VACCA and ROBERT ZINCONE

It is certified that error appears in the above-identified patent and that said Letters Patent are hereby corrected as shown below:

Column 4, Claim 1 should appear as follows:
  1. Pitch lock mechanism for a foldable rotary wing aircraft blade of the type having an axial blade spindle, an outboard hinge portion including a blade, and an inboard hinge portion --having a sleeve--journalled on said spindle for blade changing movement, said mechanism comprising female splines, on said sleeve, male splines on said spindle, a sliding splined assembly located outboard of the splines on said sleeve and spindle including a sleeve slidable in an inboard direction between said splines on said sleeve and spindle having male and female splines thereon which intermesh with the female and male splines on said sleeve and spindle respectively to lock said sleeve to said spindle when said assembly is slid inboard and means for moving said splined assembly inboard to lock said sleeve to said spindle and for moving said assembly outboard free said sleeve for pitch changing movement.

SIGNED AND
SEALED
MAY 26 1970

(SEAL)
Attest:

Edward M. Fletcher, Jr.
Attesting Officer

WILLIAM E. SCHUYLER, JR.
Commissioner of Patents